April 20, 1926.

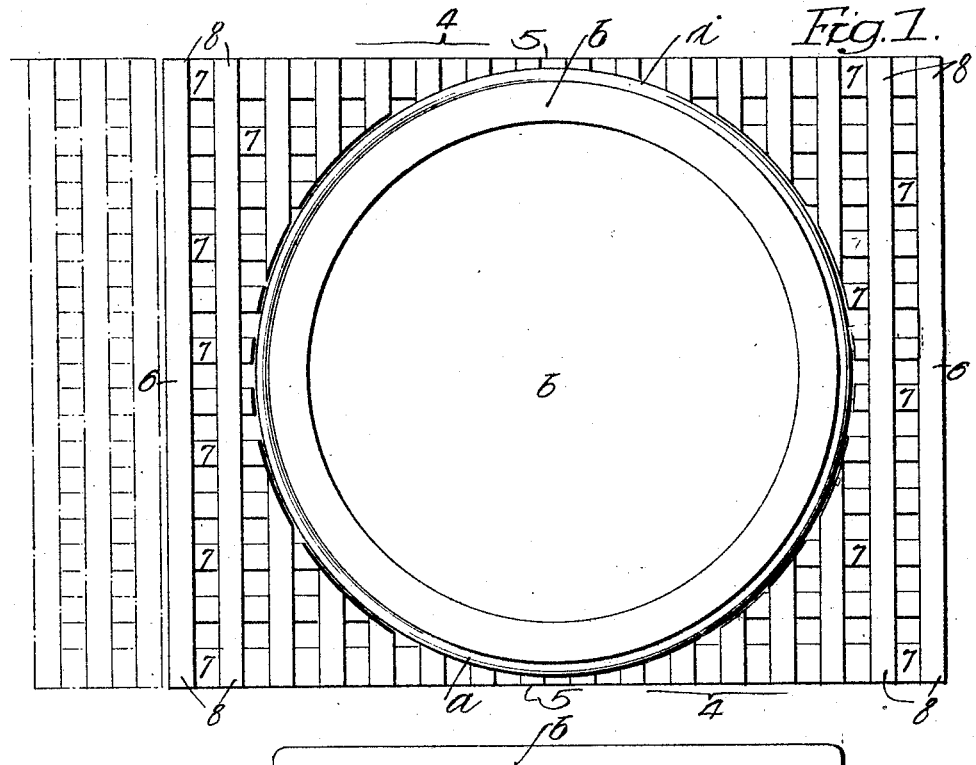
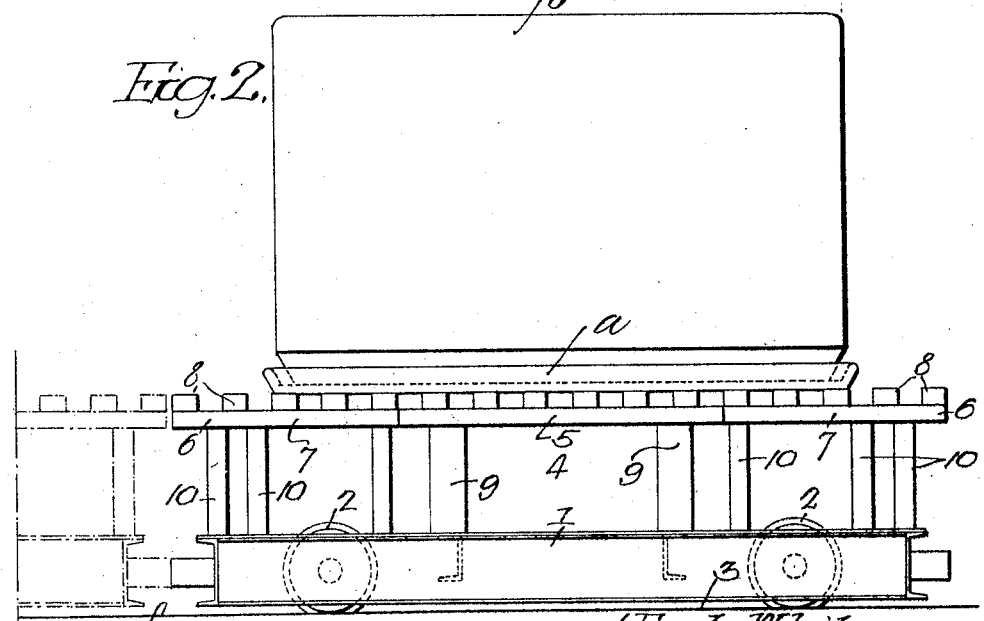

E. WHITE ET AL 1,581,993

SECTIONAL PALLET

Filed May 28, 1924

Inventors-
Earl White,
Homer B. Edwards.
by their Attorneys.

Patented Apr. 20, 1926.

1,581,993

UNITED STATES PATENT OFFICE.

EARL WHITE AND HOMER B. EDWARDS, OF ROSSFORD, OHIO, ASSIGNORS TO PROCTOR & SCHWARTZ, INCORPORATED, OF PHILADELPHIA, PENNSYLVANIA, A CORPORATION OF PENNSYLVANIA.

SECTIONAL PALLET.

Application filed May 28, 1924. Serial No. 716,462.

*To all whom it may concern:*

Be it known that we, EARL WHITE and HOMER B. EDWARDS, citizens of the United States, residing in Rossford, Wood County, Ohio, have invented certain Improvements in Sectional Pallets, of which the following is a specification.

Our invention relates to certain improvements in pallets, which are mounted on trucks and upon which glass pots and other large ceramic articles are made and which are passed through a drier while upon the pallets.

The object of the invention is to provide a pallet of this type with removable ends, which allow the potter to form the pot, &c., on the central portion of a pallet. When the pot is being passed through a drying apparatus, the sections are located at each end of the central portion of the pallet so as to cause the proper circulation of air around the pot.

In the accompanying drawings:

Fig. 1 is a plan view of our improved sectional pallet with the pot in position;

Fig. 2 is a side view;

Figure 3:
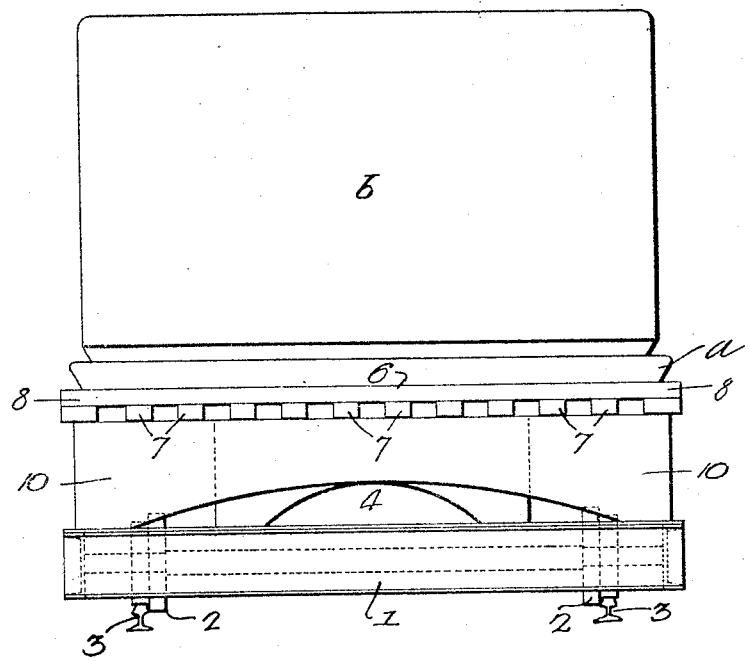
Fig. 3 is an end view.
Figure 4:
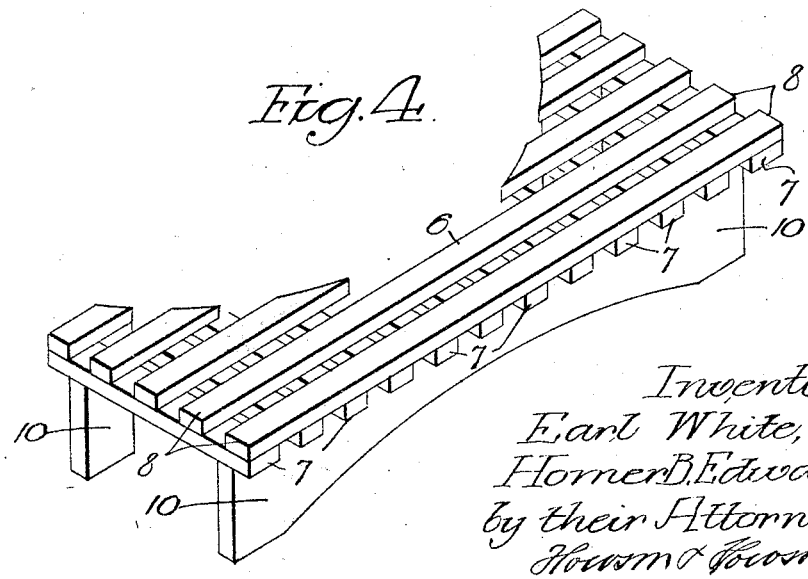
Fig. 4 is a detached perspective view of one of the detachable sections.

Referring to the drawings, 1 is a truck having wheels 2, which are adapted to rails 3 that extend through a drying apparatus known as a "tunnel drier". On each truck is a pallet 4 that is made in three sections 5, 6 and 6ª, in the present instance. The upper surface of each pallet is composed of a series of spaced longitudinal slats 7, on which is mounted a series of transverse slats 8 that form rectangular openings for the free passage of air in circulation. The central portion 5 of each pallet is supported on a truck by beams 9. The end sections are supported by beams 10, as shown clearly in Fig. 6. Each end section is cut out, as indicated in Fig. 4, to fit the central portion 5 of the pallet. On this central portion is a pan $a$, in which is formed the pot $b$.

During the process of forming the pot, it is difficult for the potter to shape the pot, for, when the pallet is made in one piece, it is impossible for the potter to stand near the pot. By removing the end sections, the pot is supported on the round central section.

After a pot is shaped, and the end sections 6, 6ª are located on each end of the truck so that, when the trucks are pushed into the drier, the end of one truck abuts the end of an adjoining truck, as shown by dotted lines in Fig. 1, a continuous foraminous bed being formed throughout the length of the drier. The arrangement of the slats of the sections may be varied, as desired, and the supporting beams may be located in different positions without departing from the essential features of our invention.

We claim:

1. The combination in a pallet, of a circular central section; and detachable end sections, one side of each section being curved to conform to the curve of the central section.

2. The combination of a truck; a pallet mounted thereon, said pallet having a detachable central section; and detachable end sections mounted on the truck, said body portions and end sections having spaced slats forming a foraminous support.

3. The combination of a truck; a detachable pallet mounted thereon, said pallet being made in three sections, the central section being circular and substantially the size of the pot which has been previously formed thereon; and end sections recessed to conform to the curve of the central section and extending at the end of the truck so that when a series of trucks are located end to end the several pallets will form a continuous foraminous support.

EARL WHITE.
HOMER B. EDWARDS.